United States Patent [19]
Klingel

[11] Patent Number: 4,912,718
[45] Date of Patent: Mar. 27, 1990

[54] DEVICE FOR A POWER LASER

[76] Inventor: Hans Klingel, Teckstrasse 91, 7141 Möglingen, Fed. Rep. of Germany

[21] Appl. No.: 228,702

[22] Filed: Aug. 4, 1988

[51] Int. Cl.$^4$ ............................................. H01S 3/02
[52] U.S. Cl. ...................................... 372/58; 372/94; 372/97
[58] Field of Search .................... 372/58, 92, 94, 97

[56] References Cited

U.S. PATENT DOCUMENTS

| | | | |
|---|---|---|---|
| 3,496,487 | 2/1970 | Softer et al. | 372/97 |
| 3,530,388 | 9/1970 | Guerra et al. | 372/94 |
| 4,426,705 | 1/1984 | Stevison et al. | 372/97 |
| 4,602,372 | 7/1986 | Sasaki et al. | 372/58 |
| 4,632,555 | 12/1986 | Malvern | 372/94 |
| 4,660,209 | 4/1987 | Osada et al. | 372/58 |

FOREIGN PATENT DOCUMENTS 0120581  6/1985  Japan ...................................... 372/97

Primary Examiner—James W. Davie

[57] ABSTRACT

The invention is based on the knowledge that a laser can be used as a basic component and that the energy can be doubled by coupling together two basic components according to the invention and that the energy can be tripled by using three basic units, and so on. The power laser constitutes one module with corners, at least two modules that are at least substantially the same are connected to each other, and the modules are connected at corners of the modules by means of a connecting flange having an interior that is impermeable to laser beams, the connecting flange establishing a rectilinear joint between two gas pipelines of different modules.

6 Claims, 5 Drawing Sheets

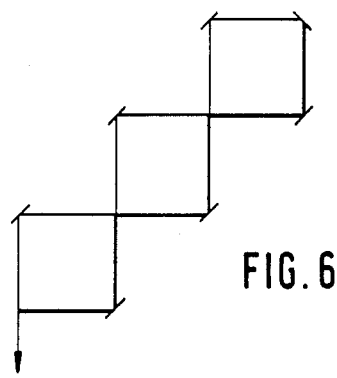
FIG. 6
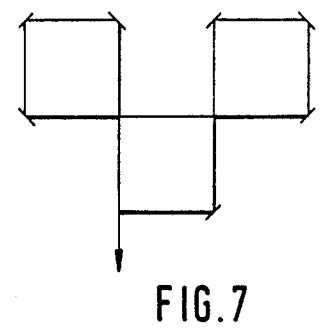
FIG. 7

FIG. 9
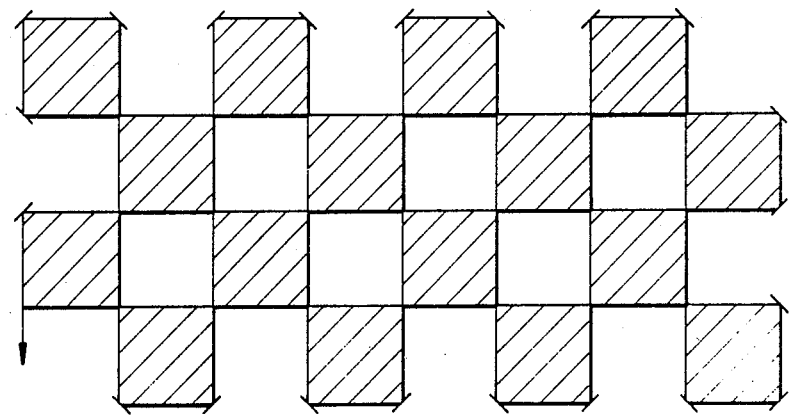

DEVICE FOR A POWER LASER

This invention relates to a power laser preferably but not essentially of the kind described in the co-pending application corresponding to West German Patent Application P 3734570.2, U.S. patent application No. 228,726 of the same inventor, filed simultaneously herewith.

BACKGROUND OF THE INVENTION

Such power lasers have the following features: intermediate corner flanges, an end flange, gas pipelines disposed in a rectangle between the intermediate corner flanges and the end flange, a support for the intermediate corner flanges and the end flange, a blower, heat exchangers, and cooling gas paths from and to the blower and from and to the gas pipelines.

In the field of power lasers, it is desirable to generate a high energy beam which as far as possible irradiates in the TEM00 mode. It is also desirable to achieve higher power inputs.

In the case of lasers used hitherto, special constructions were always necessary insofar as the dimensions of a 500 W laser differ from those of, for example, a 5000 W laser. In terms of cooling, cooling water flow, gas flow, supply and discharge of pump energy, all these lasers have to be differently designed in one way or another. This not only entails the need for special constructions at the manufacturing stage. Rather, it also makes maintenance difficult. It is also scarcely possible to start with a 500 W laser for example and then upgrade it later on to 1000 W. The costs of such a conversion are unacceptable.

OBJECT AND STATEMENT OF THE INVENTION

The object of the invention is to provide a solution by which it is possible, on the basis of the laser mentioned at the outset, to multiply the laser energy easily and rationally while retaining virtually all the structural elements.

According to the invention, this object is achieved by the following features:

(a) the power laser constitutes one module with corners, (b) at least two modules that are at least substantially the same are connected to each other, and (c) the modules are connected at corners of the modules by means of a connecting flange having an interior that is permeable to laser beams, the connecting flange establishing a rectilinear joint between two gas pipelines of different modules.

The invention is based on the knowledge that such a laser can be used as a basic component and that the energy can be doubled by coupling together or basic components according to the invention and that the energy can be tripled by using three basic units, and so on. Therefore, as with internal combustion engines, it is possible to employ the same principle by multiplying one "original cell", where of course there are also single cylinders, twin cylinders, etc. The only new structural component required is a connecting flange which is essentially nothing more than a double intermediate corner flange, certainly without a deflecting mirror.

If two such components are coupled together, then one can save on a deflecting mirror, a total reflection mirror and an output mirror. This obviously offers many advantages with regard to costs, mode improvement, even simpler cooling, improved gas flow (because the gas passes lineally through the connecting line and does not have to go around the corner). Fewer mirrors also means easier adjustment. As the mirrors are expensive, there is also a considerable saving on money. The construction remains clear and uncluttered even if a plurality of basic units are assembled together. This means that supplies such as, for example, for electricity or the like, can be set up substantially more systematically and more tidily. The principle can be repeated automatically by multiplication. Therefore, there is no need for fresh calculation because all the components including the turbine remain the same. It could be said that the only inconstant feature of the whole system is the total reflection mirror and the output mirror. With a characteristic extension of less than 1 meter for 500 Watts output for instance the individual component is still very small.

Advantageously the described embodiments include the following additional features:

At least three modules can be connected to one another in a staircase pattern. (FIG. 6). This configuration is recommended if the space allows the length to be accommodated in one room.

At least three modules can be connected to one another in a hockey stick pattern. (FIG. 7). This configuration is recommended if about the same amount of space is available to accept the width and length.

Four modules can be connected together, three of them being connected to three corners of a central module. This feature provides a laser with four module components and avoids having two of these working on only one part of the gas pipelines.

Five modules can be connected together, four of them being connected to four corners of a central module. (FIG. 8). This feature provides a structural principle for five component units.

A plurality of levels of groups of modules can be provided. This feature shows that these structural units can also be arranged in a multi-dimensional disposition.

A structural unit according to co-pending application 228,726 is described hereinafter and reference to it is made in FIGS. 1 to 4. FIGS. 5 to 11 shows the construction according to the invention. In the drawings:

DESCRIPTION OF THE DRAWINGS

FIG. 3 is a view as indicated by the arrow 3 in FIG. 1, FIG. 6 is a diagrammatic view showing the disposition of three structural units, FIG. 7 is a diagrammatic view of a different arrangement of three structural units, FIG. 9 is a diagrammatic view of the coupling together of 4×4=16 structural units.

DESCRIPTION OF PREFERRED EMBODIMENTS

Figure 4:
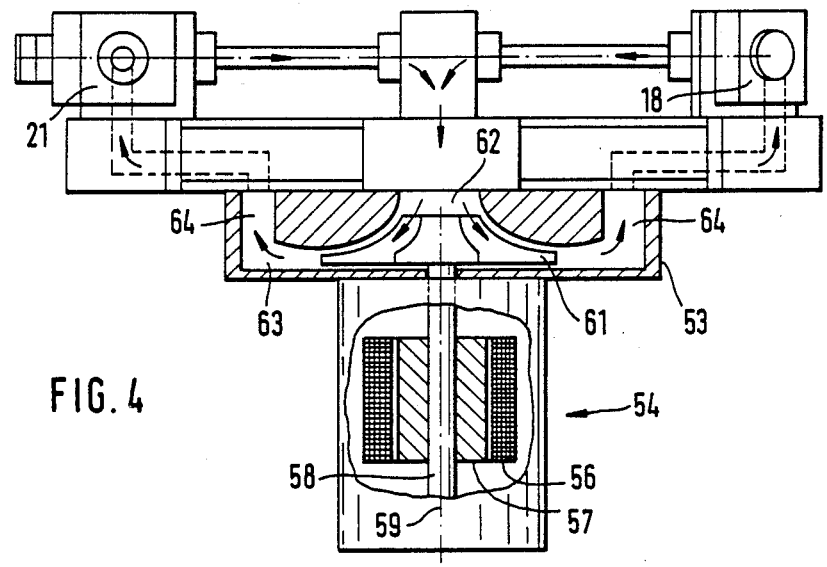
FIG. 4 is a view as in FIG. 3, but on an enlarged scale, partly broken open, showing the interior of the engine housing, the blower flange and the broken-line illustration of partial paths.

Without limiting the invention to the embodiments described, a CO2 laser 11 with an output power of 500 W stands on a table 12 to which it is rigidly connected. Provided underneath the table 12 is a turbo-radial blower 13 which is rigidly bolted to the underside of the table 12. The device shown in FIGS. 3 and 4 is one unit. It stands on a frame, not shown. The laser has a beam path 14 shown by a dash-dotted line. It extends in a quadratic pattern. The beam length is 2650 mm. The diameter of the beam is 10 mm and it irradiates in the TEM00 mode. The beam path 14 comprises three intermediate corner flanges 16, 17, 18 which accommodate both diagrammatically shown 45 degree mirrors and also fittings 19 for gas pipes. Provided at the fourth corner is an end flange 21 comprising a totally reflecting mirror 22 and an output mirror 23. In the end flange 21, the beam path 14 intersects at 90 degrees. Exactly in the center between the first intermediate corner flange 16 and the second interemediate corner flange 17 there is in a first gas pipeline 24 a first through-flange 26 which has fittings 19 on both sides. Extending between the intermediate corner flange 16 is a gas pipe 27 which is held in gas-tight fashion at both ends, and between the through-flange 26 and the intermediate corner flange 17 there is a gas pipe 28 which is held in gas-tight fashion in fittings 19. Both gas pipes 27, 28 are enclosed by HF electrodes 30. Exactly in the center of the second gas pipeline 29 there is a second through-flange 31. Exactly in the center of the third gas pipe 32 there is a third through-flange 33 and in the fourth gas pipe 34 there is a fourth through-flange 36. The gas pipelines are in each case at right angles to one another and, if one disregards the beam path which extends beyond the point of intersection 37, they form a geometrical square. Since the proportions in terms of gas pipes 27, 28 and electrodes 30 are identical in the lines, they require no further explanation.

Diagonals 38, 39 drawn through the corners of the square intersect at 41.

Apart from the visible chamfers at the corners, the table 12 likewise forms a square measuring 850 mm along each edge. Its height is 80 mm. It has a flat upper wall 42 and a flat lower wall 43 which are in each case one-piece steel plates. The steel plate itself is gas-tight with the exception of the apertures provided to suit the intended purpose. The table 12 has on its periphery peripheral walls 44 which close off the resultant cavity 46 in gas-tight fashion in respect of the outside environment, being welded to the upper wall 42 and the lower wall 43. Coaxially with the point of intersection 41, the lower wall 43 has a central hole 47. On a radius of about ⅓ of half the diagonal length, the lower wall comprises four holes 48, 49, 51, 52. The diagonal 39 passes through the holes 49, 52 while the diagonal 38 passes centrally through the holes 48, 51. Bolted securely in gas-tight manner to the underside of the lower wall 43 in a housing 53 of the blower 13. A motor 54 comprises a stator 56 and a rotor 57, the shaft 58 of which has a geometrical longitudinal axis 59 which passes through the point of intersection 41. Mounted on the shaft 58 is a turbine rotor 61 which has above its upper end face a vacuum space 62 which communicates directly with the central hole 47. A pressure space 63 is provided in the housing 53 downstream of the turbine rotor 61. The pressure space 63 has upwardly extending arms 64 which communicate directly with the holes 48–52. Emanating from the hole 48 is a first partial path 66 in which the gas flows as indicated by the arrow 67. Between the upper wall 42 and the lower wall 43 are welded gas-tight partitions 68, 69 which are at right angles to each other. In accordance with FIG. 2, the partition 68 extends from 6 o'clock to 12 o'clock while the partition 69 extends from 9 o'clock to 3 o'clock. They are spaced everywhere from the hole 48 so that gas can emerge freely from it. From the partitions 68, 69, two mutually parallel positions 71, 72 extend at a considerable distance from each other and parallel with the diagonal 38. Provided in the partial path 66 is a heat exchanger 73, the connections of which traverse the lower wall 43. They are not shown. Under the intermediate corner flange 16, the upper wall 42 comprises a hole, not shown, which corresponds to the hole 48. This hole which is not shown communicates directly with the interior of the gas-tight intermediate corner flange 16. According to the dash-dotted lines 74, 76, gas is able to flow out of the partial path 66 into the intermediate corner flange 16 and thence into the gas pipe 27 and the gas pipe 77. Since the partial paths 78, 79, 81 are virtually identical in construction, they are not described in further detail. It is evident that the partial paths 78, 81 are disposed under the diagonal 39 while the partial paths 66, 79 are under the diagonal 38. It can also be said that the partial paths 66, 78, 79, 81 are symmetrically stellate and extend in a like configuration. The flow directions are shown as arrows.

Figure 2:
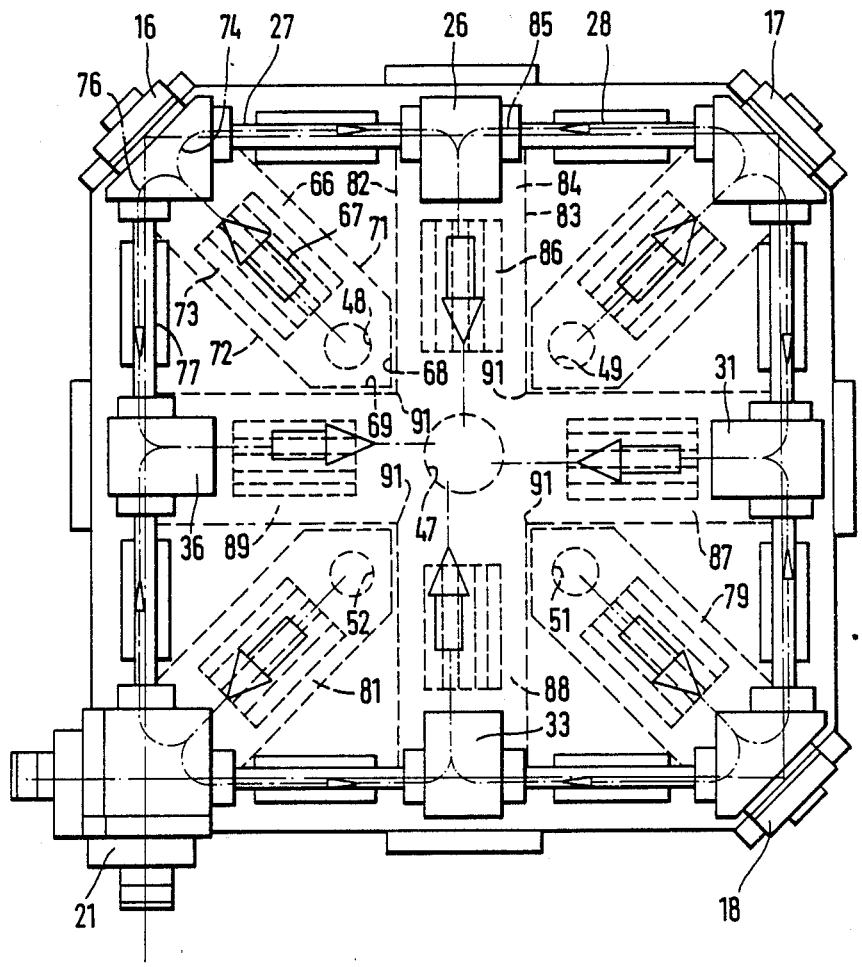
FIG. 2 is a plan view according to FIG. 1, but larger, showing the interior of the table top.

Parallel with one another and spaced apart by a considerable distance and parallel with the angle bisector of the diagonals 38, 39, two straight partitions 82, 83 extend from the central hole 47 and its environment, vertically upwardly in FIG. 2. This provides a partial path 84 for gas dispersal. The gas flows out of the gas pipes 27, 28 into the through-flange 26 which is in this respect hollow. In the direction of the upper wall 42, it comprises a hole, not shown, which communicates with a likewise not shown hole disposed directly underneath it in the upper wall 42. The line 74 symbolising the gas flow meets a line 85 symbolising a further gas flow, in the through-flange 26. Both gas flows are of the same magnitude. They pass through the holes not shown and into the partial path 84, where they flow through a heat exchanger 86 and are drawn off through the hole 47 into the vacuum space 62. In the same way, a partial path 87 containing a heat exchanger leads from the through flange 31 to the central hole 47, a partial path 88 leads from the through-flange 33 to the central hole 47 and likewise a partial path 89 leads from the through-flange 36. The partitions 82, 83 form with the walls bounding the other partial paths a large cross the corners 91 of which end substantially before the central hole 47. This makes for good flow conditions since the flows are symmetrical and of the same size, encountering no obstacles and being guided along a linear path. This linear guidance naturally also applies to the other partial paths 66, 78, 79, 81. Around the holes 48, 49, 51, 52 which represent sources there is a lot of space and likewise around the hole 47 which constitutes a sink. The distances between the partitions of each partial path are the same so that also the specific flow resistance is the same.

The height of the assembly shown in FIG. 3 is approx. 80 cm. Therefore, it is necessary only to provide a space 80 cm high and approx. 85 cm square.

Figure 1:
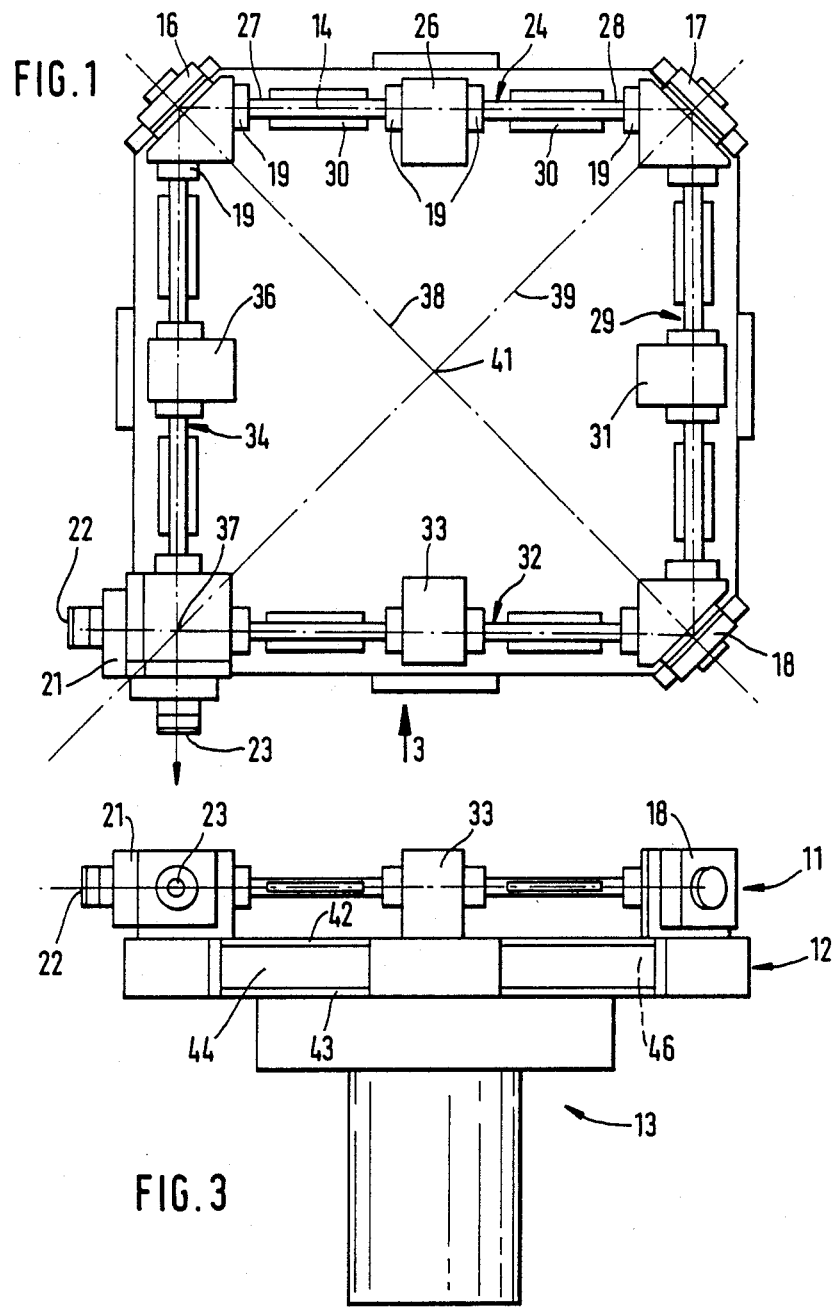
FIG. 1 is a diagrammatic plan view of a horizontally disposed laser.
Figure 5:
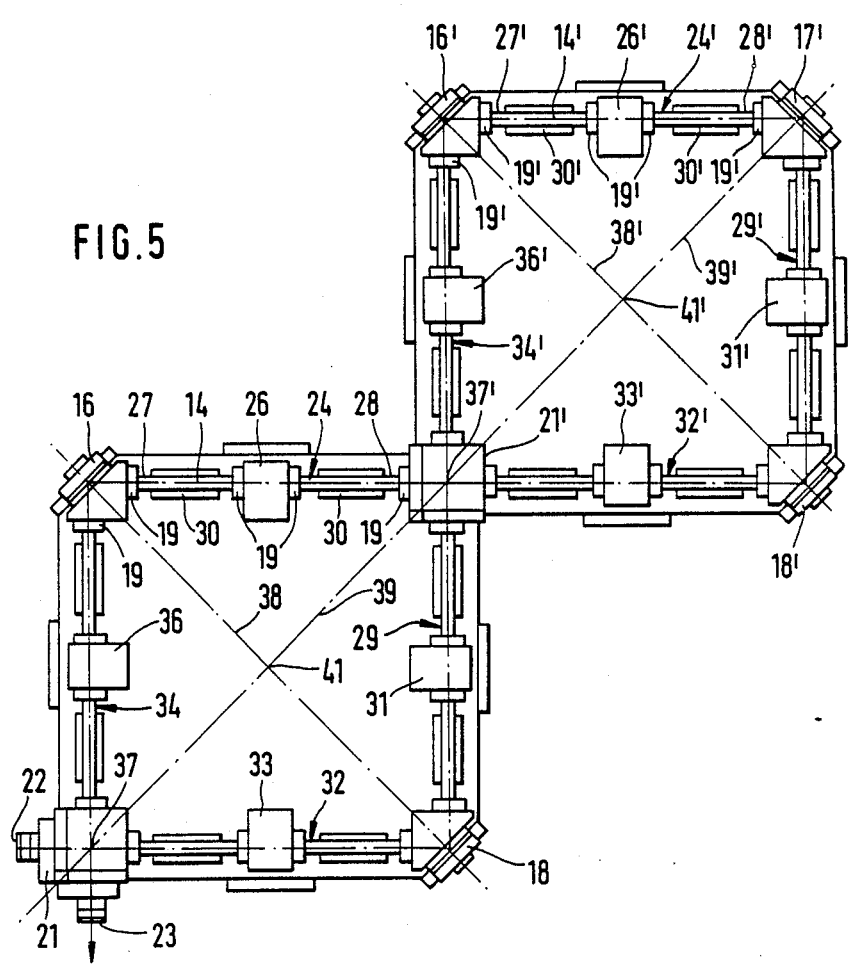
FIG. 5 shows the coupling together of two structural units created essentially from duplication of FIG. 1.

The laser according to FIG. 5 is created from two lasers as shown in FIG. 1, the structural unit shown in the bottom left hand corner having been connected to the identical structural unit shown in the top right hand corner, by a connecting flange 21'. Therefore, the unit shown bottom left is missing the intermediate corner flange 17', in comparison with FIG. 1, while the unit shown top right has neither a mirror 22 for total reflection nor an output mirror 23. Instead, the beam path there is continuously linear at exactly 90° to the connecting flange 21'. The beam crosses the centre of the connecting flange 21' and it is well known that this does not entail any structural or heat problems.

If one wished to see how the blower, the heat exchangers and the cooling gas paths are disposed in relation to the gas pipelines, then it would be necessary only to take FIG. 2 and—as happened in FIG. 5—link two pictures together by the corner, using a connecting flange and one would then be able to see the structural details which are disclosed by FIG. 5.

FIG. 6 shows the interconnection of three structural units in comparison with the two units shown in FIG. 5. The arrow shown bottom left in FIG. 6 indicates the laser beam output. As can be seen, seven deflecting mirrors are needed each offering a 45° deflection, and also two identical connecting flanges. It is easy to count up the deflecting mirrors, total reflection mirror and output mirrors which it is possible to save by this arrangement.

FIG. 7 shows that it is not always necessary to build on by connection to the diagonally opposite corner. Instead, it is also possible to build on at two adjacent corners of the first unit.

Figure 8:
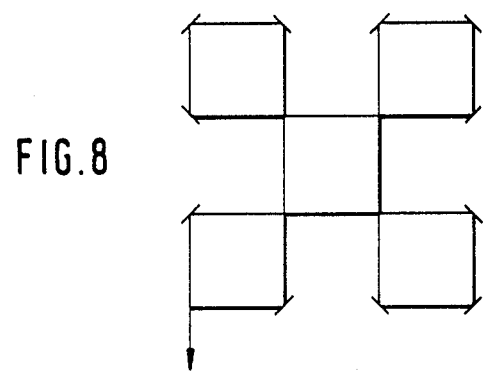
FIG. 8 is a diagrammatic view of five structural units.

The configuration of five units shown in FIG. 8 can be imagined as being a development from FIG. 6, a unit having been attached to the still free corners of the middle unit. As the illustration shows, only four simple continuous connecting flanges are needed. If one follows the laser beam in FIG. 8, one can see that all the gas pipelines are used for the laser.

FIG. 9 shows an arrangement of 16 units arranged in a chessboard pattern. The laser beam produced is represented by an arrow pointing downwards. However, the output could be located at any other desired outer corner. One structural unit has been picked out by the cross hatching. Although there are 4×4=16 units, only 20 45° deflecting mirrors are needed. In proportion to the number of units, this is only a small number and demonstrates the law by which it is possible to economise more and more on deflecting mirrors the more the system is brought up in such a way as to be closed in itself. 21 connecting flanges are needed but, as explained above, there are structurally simple. Here, as with the other interlinking arrangement, no mirror has to be cooled in the connecting flanges which is why the invention becomes simpler. Naturally, a total reflection mirror and an output mirror wall always be required somewhere.

Figure 11:
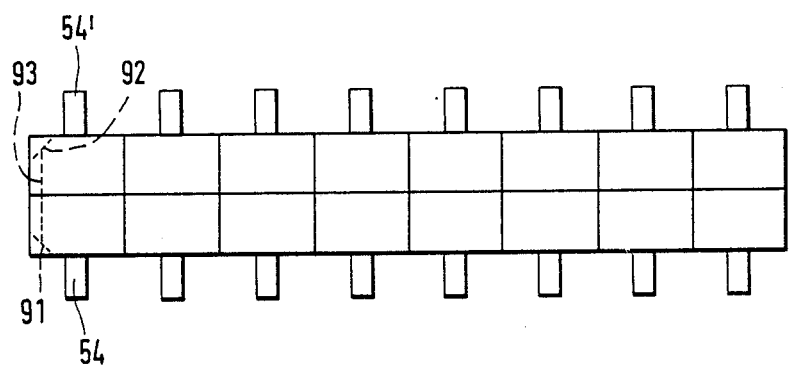
FIG. 11 is a diagrammatic view of the arrangement in FIG. 9 viewed from the side and a further duplication by disposing the structural units on two levels.

According to FIG. 11, it is also possible to work on two levels and so double the output once again in comparison with the arrangement in FIG. 9, without having to provide for a larger or 8. Here all that is required are the 45° mirrors shown by the broken lines which, instead of reflecting in the plane of the drawing in FIG. 9, reflect perpendicularly and once from one plane or level into the other. These linking mirrors which connect two levels to one another are identified by reference numerals 91 and 92. As can be seen, the motors 54 of the lower level project downwardly while the motors 54' of the upper level project upwardly. Where the basis unit is concerned, it is of course possible to provide this in any position in the room. For example, the device according to FIG. 9 need not necessarily be disposed horizontally. Instead, it can also be disposed vertically like a wall and accordingly, too, the device according to FIG. 11 could so to speak form a vertical double wall.

Figure 10:
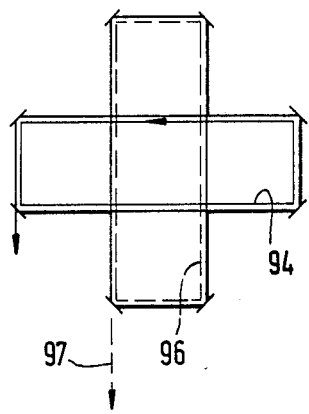
FIG. 10 is a view showing how four structural units ought not to be coupled to one another.

FIG. 10 shows how the structural elements ought to be connected to one another: if one follows the path of the beam which extends according to the loop 94, then it is evident that those gas pipelines which lie in the loop 96 which is shown by the broken lines, are not used. Therefore, the result is far less than four times the energy output. This arrangement would however be feasible if one were to want to generate two independent laser beams. It would then be necessary in addition to have the output as indicated for example by the arrow 97 shown by the broken lines, naturally omit the 90° mirror there and also provide an end flange 21 of the type shown in FIG. 1. Then there would be two laser beams in a stereo arrangement.

I claim:

1. In a power laser arrangement comprising a power laser having
   an active media;
   pumping means;
   output means;
   a resonant cavity comprising gas pipelines for said active media,
   intermediate corner flanges connected to said gas pipelines of 90 degree beam path bends,
   an end flange connected to certain of said gas pipelines,
   said gas pipelines being disposed in a rectangle between said intermediate corner flanges and said end flange, and
   through flanges connected to said gas pipelines and arranged on every side of said rectangle;
   means supporting said intermediate corner flanges and said end flange;
   a blower;
   heat exchanger; and
   cooling gas paths from and to said blower and from and to said gas pipelines;
   the improvement wherein
   (a) said power laser constitutes one module with corners,
   (b) at least two modules that are at least substantially the same are connected to each other, and
   (c) said modules are connected at corners of said modules by means of a connecting flange having an interior that is permeable to laser beams, said connecting flange establishing a rectilinear joint between two gas pipelines of different modules.

2. Laser arrangement according to claim 1, comprising at least three modules connected to one another in a staircase pattern.

3. Laser arrangement according to claim 1, comprising at least three modules connected to one another in a hockey stick pattern.

4. Laser arrangement according to claim 1, comprising four modules, three of them being connected to three corners of a central module.

5. Laser arrangement according to claim 1, comprising five modules, four of them being connected to four corners of a central module.

6. Laser arrangement according to claim 1, comprising a plurality of levels of groups of modules.

* * * * *